United States Patent
Gupta et al.

(10) Patent No.: US 9,235,594 B2
(45) Date of Patent: Jan. 12, 2016

(54) SYNCHRONIZING UPDATES ACROSS CLUSTER FILESYSTEMS

(75) Inventors: Karan Gupta, San Jose, CA (US); Manoj P. Naik, San Jose, CA (US); Frank B. Schmuck, Campbell, CA (US); Mansi A. Shah, Sunnyvale, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/589,256

(22) Filed: Aug. 20, 2012

(65) Prior Publication Data

US 2013/0138616 A1 May 30, 2013

Related U.S. Application Data

(63) Continuation of application No. 13/305,784, filed on Nov. 29, 2011, now abandoned.

(51) Int. Cl.
*G06F 17/30* (2006.01)

(52) U.S. Cl.
CPC ................................ *G06F 17/30174* (2013.01)

(58) Field of Classification Search
CPC ..... G06F 17/30; G06F 2201/84; G06F 11/14; G06F 17/3023; G06F 17/30088; G06F 17/30212; G06F 17/30144; G06F 17/30575; G06F 11/1471; G06F 11/1469; G06F 11/1448; G06F 11/1446; Y10S 707/999; Y10S 707/99953; Y10S 707/99954; Y10S 707/99955
USPC ......... 707/639, 624, 681, 679, 682, 649, 674, 707/680, 640, 683, 684, 685, 999.202, 707/999.204; 711/162

See application file for complete search history.

(56) References Cited

U.S. PATENT DOCUMENTS

| | | | |
|---|---|---|---|
| 6,144,999 A | 11/2000 | Khalidi et al. | |
| 6,434,681 B1 | 8/2002 | Armangau | |
| 6,993,539 B2 | 1/2006 | Federwisch et al. | |
| 7,100,089 B1 | 8/2006 | Phelps | |
| 7,546,364 B2 | 6/2009 | Raman et al. | |
| 7,546,431 B2 | 6/2009 | Stacey et al. | |
| 7,567,991 B2 | 7/2009 | Armangau et al. | |
| 7,657,582 B1 * | 2/2010 | Cram et al. | 707/640 |
| 7,769,722 B1 * | 8/2010 | Bergant et al. | 707/681 |
| 7,797,582 B1 | 9/2010 | Stager et al. | |
| 7,809,691 B1 * | 10/2010 | Karmarkar et al. | 707/674 |
| 8,027,958 B1 * | 9/2011 | Chapman | 707/679 |
| 8,082,232 B2 * | 12/2011 | Okada et al. | 707/682 |

(Continued)

OTHER PUBLICATIONS

Sundararaman et al., Membrane: Operating System Support for Restartable File Systems, ACM Transactions on Storage, vol. 6, No. 3, Sep. 2010, pp. 1-30.

*Primary Examiner* — Dennis Truong
(74) *Attorney, Agent, or Firm* — Lieberman & Brandsdorfer, LLC

(57) ABSTRACT

Embodiments of the invention relate to synchronization of data in a shared pool of configurable computer resources. An image of the filesystem changes, including data and metadata, is captured in the form of a consistency point. Sequential consistency points are created, with changes to data and metadata in the filesystem between sequential consistency captured and placed in a queue for communication to a target filesystem at a target site. The changes are communicated as a filesystem operation, with the communication limited to the changes captured and reflected in the consistency point.

20 Claims, 9 Drawing Sheets

(56) References Cited

U.S. PATENT DOCUMENTS

| | | |
|---|---|---|
| 8,095,511 B2 * | 1/2012 | Zwilling et al. ............. 707/649 |
| 8,121,981 B2 * | 2/2012 | Simek et al. ................. 707/649 |
| 8,200,638 B1 * | 6/2012 | Zheng et al. ................. 707/679 |
| 8,527,462 B1 * | 9/2013 | Talius et al. ................. 707/639 |
| 2003/0182313 A1 * | 9/2003 | Federwisch et al. ......... 707/200 |
| 2003/0182325 A1 * | 9/2003 | Manley et al. ............... 707/204 |
| 2004/0267836 A1 | 12/2004 | Armangau |
| 2004/0268068 A1 * | 12/2004 | Curran et al. ................ 711/162 |
| 2005/0015416 A1 * | 1/2005 | Yamagami .................... 707/204 |
| 2005/0262097 A1 * | 11/2005 | Sim-Tang et al. ............. 707/10 |
| 2006/0053139 A1 | 3/2006 | Marzinski et al. |
| 2006/0112219 A1 * | 5/2006 | Chawla et al. ................ 711/114 |
| 2008/0228879 A1 * | 9/2008 | Cardone et al. .............. 709/205 |
| 2008/0256138 A1 * | 10/2008 | Sim-Tang ..................... 707/202 |
| 2009/0177718 A1 * | 7/2009 | Patterson et al. ............ 707/204 |
| 2009/0240744 A1 | 9/2009 | Thomson et al. |
| 2009/0307277 A1 * | 12/2009 | Grubov et al. ............... 707/203 |
| 2009/0307373 A1 * | 12/2009 | Cardone et al. .............. 709/238 |
| 2010/0145909 A1 * | 6/2010 | Ngo ............................. 707/611 |
| 2010/0257142 A1 * | 10/2010 | Murphy et al. ............... 707/681 |
| 2011/0082835 A1 | 4/2011 | Agrawal |
| 2011/0276578 A1 * | 11/2011 | Allalouf ............... G06F 3/0604 707/755 |
| 2012/0011176 A1 * | 1/2012 | Aizman ........................ 707/822 |
| 2012/0317074 A1 * | 12/2012 | Ngo ............................. 707/611 |
| 2013/0117237 A1 * | 5/2013 | Thomsen et al. ............. 707/683 |
| 2013/0124798 A1 * | 5/2013 | Aszmann et al. ............. 711/114 |

* cited by examiner

SYNCHRONIZING UPDATES ACROSS CLUSTER FILESYSTEMS

CROSS REFERENCE TO RELATED APPLICATION(S)

This application is a continuation patent application claiming the benefit of the filing date of U.S. patent application Ser. No. 13/305,784 filed on Nov. 29, 2011, and titled "Synchronizing Updates Across Cluster Filesystems" now pending, which is hereby incorporated by reference.

BACKGROUND

This invention relates to data synchronization across cluster filesystems. More specifically, the invention relates to tracking changes in a filesystem and replaying the changes to another filesystem using a standard protocol.

In a scalable and writable caching system that caches remote file data, data is fetched from a remote site and updates made at the cache site, also known as the source site, and replayed at the remote site, also known as the target site. It is known that network connectivity between the source and target sites may be subject to temporary disconnects. When a disconnection between the two sites occurs, the source site should still be available for access to data that is previously cached, and as such, the source site continues to support both data and metadata updates. At such time as connectivity between the two sites is restored, the data and metadata updates need to be synchronized to the target site.

BRIEF SUMMARY

This invention comprises a method for synchronization of update data and metadata from a source data site in communication with a shared pool of configurable computing resources to a target data site.

In one aspect, a method is provided for synchronization of the update data. A consistency point is created in a source filesystem on a periodic basis. Each consistency point represents filesystem data and metadata at a point-in-time, and is employed to establish a recovery point. More specifically, the periodic creation of the consistency point includes a first consistency point is created at a first point-in-time and a second consistency point is created at a second point-in-time. The first and second consistency points are compared to identify any differences. In addition, a source filesystem object is mapped to a target filesystem object based upon a corresponding relationship between the objects. The identified differences are applied between the first and second consistency points. More specifically, the application of differences includes replaying the identified differences as one or more filesystem operations.

In another aspect, a method is provided to synchronize update data. More specifically, a first consistency point is created in a source filesystem at a first point-in-time, and a second consistency point is created in the source filesystem at a second point-in-time. The first consistency point represents filesystem data and metadata at a first point-in-time and functions to establish a first recovery point. The second consistency point represents filesystem data and metadata at a second point-in-time and functions to establish a second consistency point. Following a communication failure associated with the source filesystem, the first consistency point is compared with the second consistency point. The comparison includes identifying changes between the first and second consistency points. The identified changes between the first and second consistency points are applied to support the synchronization. More specifically, the application includes replacing the changes as a filesystem operation based upon a mapping of a source filesystem object to a target filesystem object.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
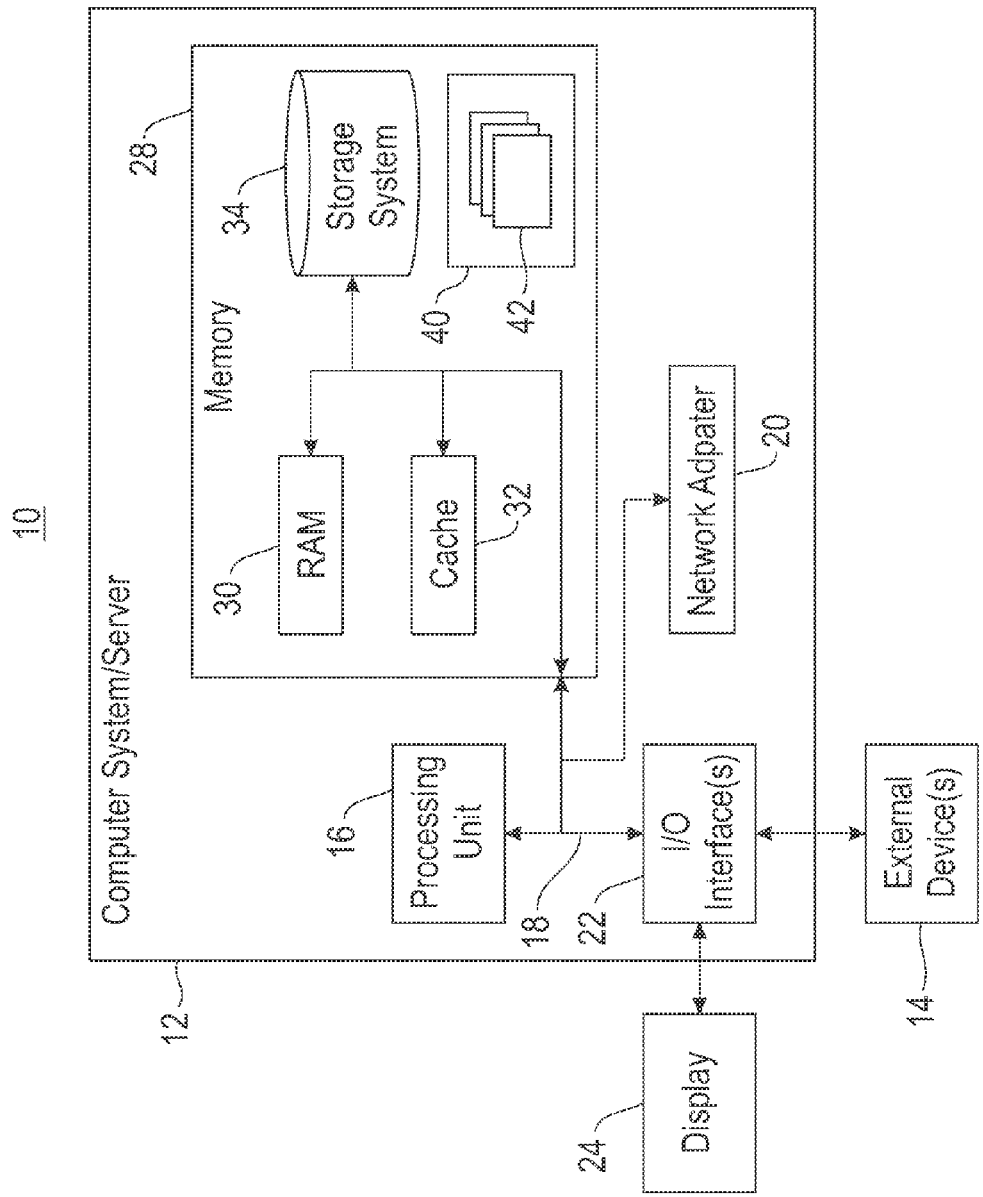
FIG. 1 depicts a cloud computing node according to an embodiment of the present invention.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a data mover, a replication manager, a migration manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/ server (12). Examples, include, but are not limited to: microcode, device drivers, redundant processing units, external disk drive arrays, RAID systems, tape drives, and data archival storage systems, etc.

Figure 2:
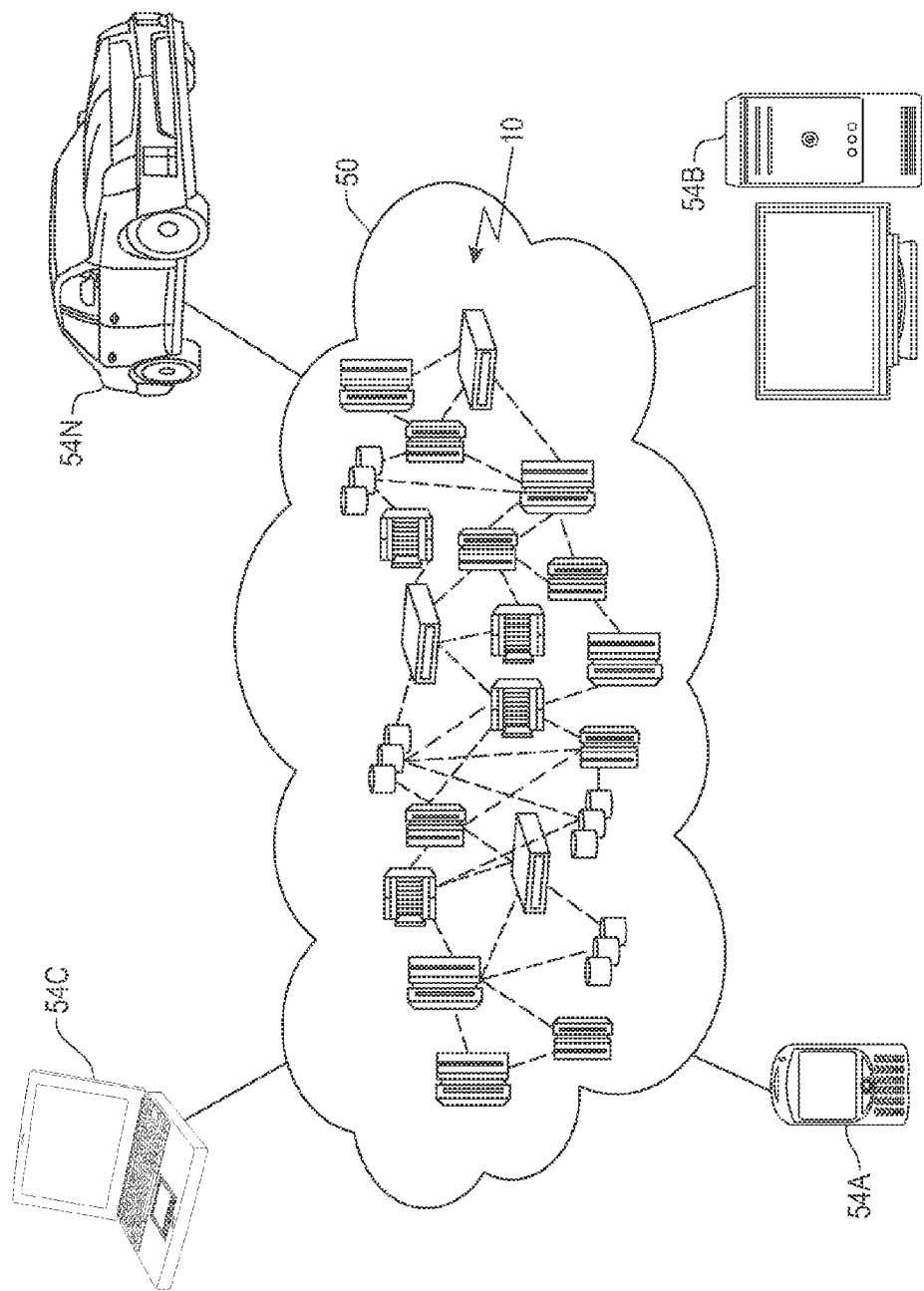
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
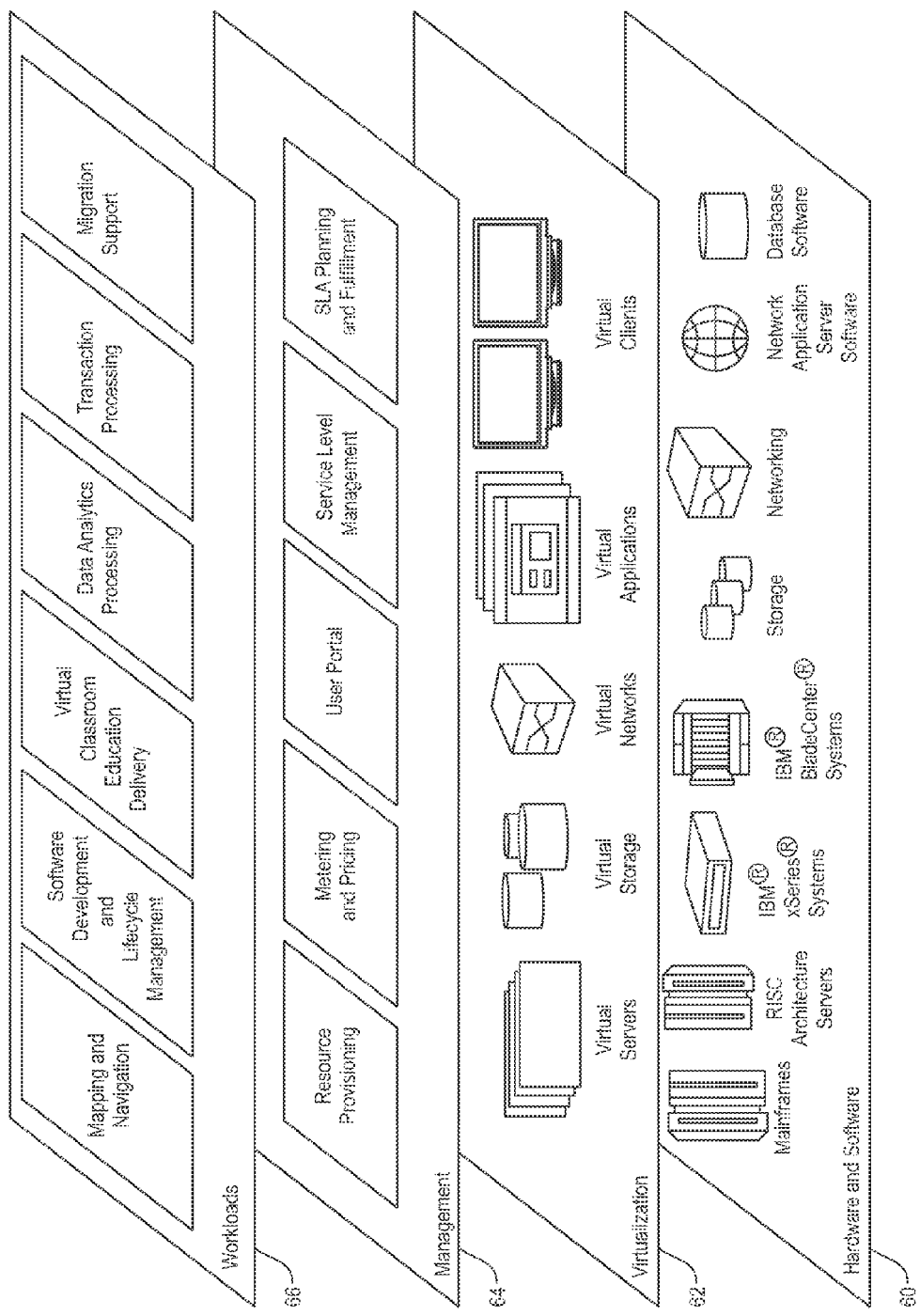
FIG. 3 depicts abstraction model layers according to an embodiment of the present invention.

Referring now to FIG. 3, a set of functional abstraction layers provided by cloud computing environment (50) (FIG. 2) is shown. It should be understood in advance that the components, layers, and functions shown in FIG. 3 are intended to be illustrative only and embodiments of the invention are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer includes, but is not limited to: mapping and navigation; software development and lifecycle management; virtual classroom education delivery; data analytics processing; operation processing; and maintenance of consistent application data to support migration within the cloud computing environment.

In the shared pool of configurable computer resources described herein, hereinafter referred to as a cloud computing environment, applications may migrate to any data center, also referred to herein as a data site. There are two general scenarios in which an application is subject to migration, including a planned migration and an unplanned migration. In a planned migration, the application migrates to any data center, i.e. target site, in the cloud while maintaining disaster recovery support, and in an unplanned migration the application is subject to failure and recovers in any data center in the cloud while maintaining disaster recovery support. Accordingly, the difference between a planned migration and an unplanned migration is the failure and subsequent recovery of a failed application.

The source site is the primary location of data, and the target site provides a replica of the source data. In one embodiment, the source site operates in a read-write mode to support both read and write operations, and the target site operates in a read-only mode and is limited to supporting read operations. Continuous synchronization of source data with the target site is provided. In one embodiment, a failure of the source site is followed by a target site being upgraded to a new source site to support both read and write operations. Such an upgrade may require applications and/or tools to be migrated to the new source site to support the functionality of the new source site.

Figure 4:
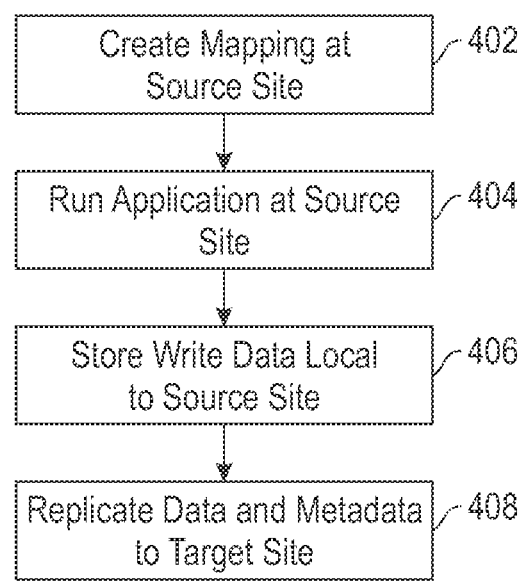
FIG. 4 depicts a flow chart illustrating a process for placing changes to the data and metadata at a source site in a queue for communication to a target site.

Data from the source site is defined at a file set level. In one embodiment, a fileset is a subtree of the filesystem namespace that provides an administrative boundary for data management. As such, the granularity of replication and consistency is a file set. The aspect of the defined granularity guarantees that all dependent writes across all files within a given file set are guaranteed to be ordered. FIG. 4 is a flow chart (400) illustrating the aspect of placing changes to the data and metadata at the source site in a queue for communication to the target site. Prior to placing any data and/or metadata changes in the queue, a mapping at the source site with file identifier spaces at the source and targets sites is created (402). More specifically, the inode numbers at the source site need to be mapped to the equivalent inode numbers at the target site, and the filenames at the source site may need to be mapped to the equivalent filenames at the target site.

An application runs at the source site (404). The application may support read and/or write operations. Data generated from a write operation is stored in data storage local to the source site in which the application is processing, e.g. local storage (406). At the same time, the data created from the write operation is replicated from the local data storage to backup data storage at the target site while the application continues to process one or more operations (408). The replication at step (408) includes both data and metadata from the write operation. The replication at step (408) may be conducted synchronously or asynchronously from one or more server nodes in the source site to one or more server nodes in the target site. Regardless of the format of the replication at step (408), a data consistency point is created on both the source and target data storage. The creation of the consistency point ensures that should the application be subject to a failure, the application can recover from a consistent data set.

A consistency point can be achieved using several different methods known to someone skilled in the art. In one embodiment, a filesystem or storage system snapshot is taken and copy-on-write semantics are employed to save data at a certain point-in-time without delaying application requests for an extended period of time. In one embodiment, any level of consistency can be used, including, but not limited to, application, crash, filesystem, etc. Accordingly, data and metadata from one or more write operations are stored in source data storage and replicated to target data storage, with creation of one or more consistency points in both data storage locations.

Periodic consistency points are created and maintained at both the source and target locations, with the consistency points functioning as recovery points in the event of a site failure. More specifically, a consistency point is taken local to the source site, and once all of the data reflected in the consistency point has been transmitted to the target site, a consistency point is created at the target site. Accordingly, as changes to data and metadata take place at the source site, these changes are reflected in a consistency point local to the source site, and communicated to the target site where a target consistency point is created local to the target site.

Figure 5:
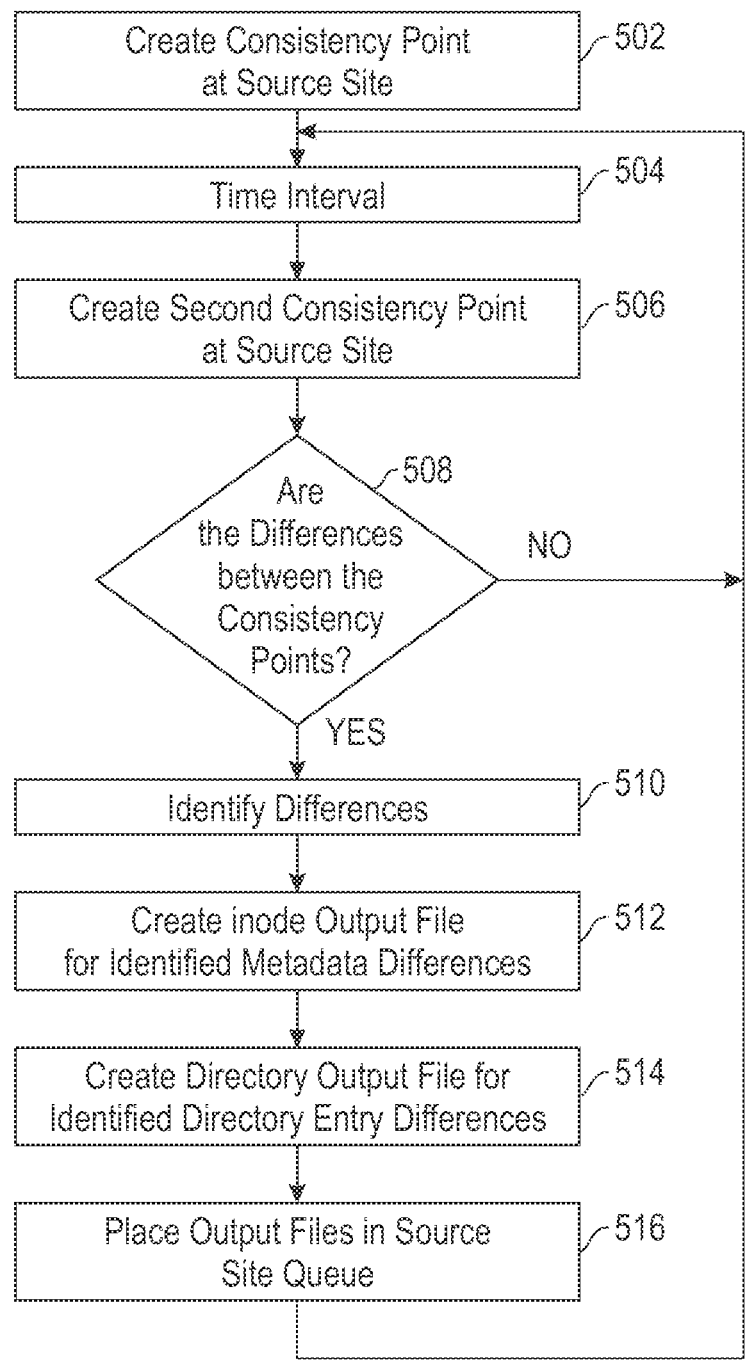
FIG. 5 depicts a flow chart illustrating a process for management of consistency points at the source site.

To support efficient use of network bandwidth, the transmission of consistency points from the source site to the target site may be limited to differences from a prior consistency point. FIG. 5 is a flow chart (500) illustrating a process for management of consistency points at the source site. A first consistency point is created local to the source site (502). Following a time interval (504), a second consistency point is created local to the source site (506). It is determined if there are any differences between the first and second consistency points (508). A positive response to the determination at step (508) is followed by identifying the specific differences (510). More specifically, the comparison of the consistency points at the source site includes searching both metadata as reflected in inodes, and data as reflected in directory entries that may have been created, deleted or modified. For any inode metadata that is identified as having a difference, an inode output file is created (512) and for any directory entries that are identified as having a difference, a directory output file is created (514). In one embodiment, it is not required to create and store the output file. More specifically, the difference(s) can be queued for replay at a secondary site directly without using an intermediate file, e.g. the output file. Similarly, in one embodiment, the output in either the form of a queue or file may be created in a single pass. The step of replaying the output file as a series of filesystem operations may take place concurrently or in parallel to the target site. In one embodiment, the filesystem operation(s) may be a standard and/or non-proprietary filesystem operation, such as a portable operating system interface for UNIX (POSIX) filesystem operation. Accordingly, one or more output files are created or a queue is implemented for replay of the identified metadata and data differences.

Following creation of any output files at steps (512) and/or (514), the output files are placed in an in-memory queue local to the source site (516). At the same time, the source site may continue to process read and write operations, which may include further changes to data and/or metadata. Following step (516) or a negative response to the determination at step (508), the process continues with a return to step (504), followed by repetition of creation of subsequent consistency points and comparison thereof. In one embodiment, the application of one or more differences between consistency points is not limited to successive consistency points. More specifically, the identified differences can be between any two consistency points. For example, the differences between two consistency points can be replayed to revert changes. If S1 and S2 are successive consistency points taken at times T1 and T2, respectively, and where T1 occurs before T2, the target site can be at a consistency point S1 and brought forward in time to S2, or the target site can be at a consistency point S2 and moved back in time to S1. The first and second consistency points are not always successive in time, the consistency points can be any two consistency points. Accordingly, consistency points are created on a periodic basis, with differences between compared consistency points identified and placed in a queue for communication to the target site.

It is recognized that there may be a communication failure between the source site and the target site. Failures occur for various reasons, and the details of such failures and their causes are not the subject of this invention. However, in the event of failure a disaster recovery is employed to establish or re-establish consistency at both the data and metadata levels between the source site and the target site. In one embodiment, the transmission of data in the queue occurs asynchronously in a continuous manner. If the source site experiences a node or site failure, the target site will not receive any changes that may have been in the queue at the time of failure. Following detection of a communication failure between the source and target sites, an algorithm is invoked to interpret and execute operations on the source site. The execution operations include two aspects associated with the consistency points, one aspect pertaining to differences of metadata and a second aspect pertaining to differences of data.

Figure 6:
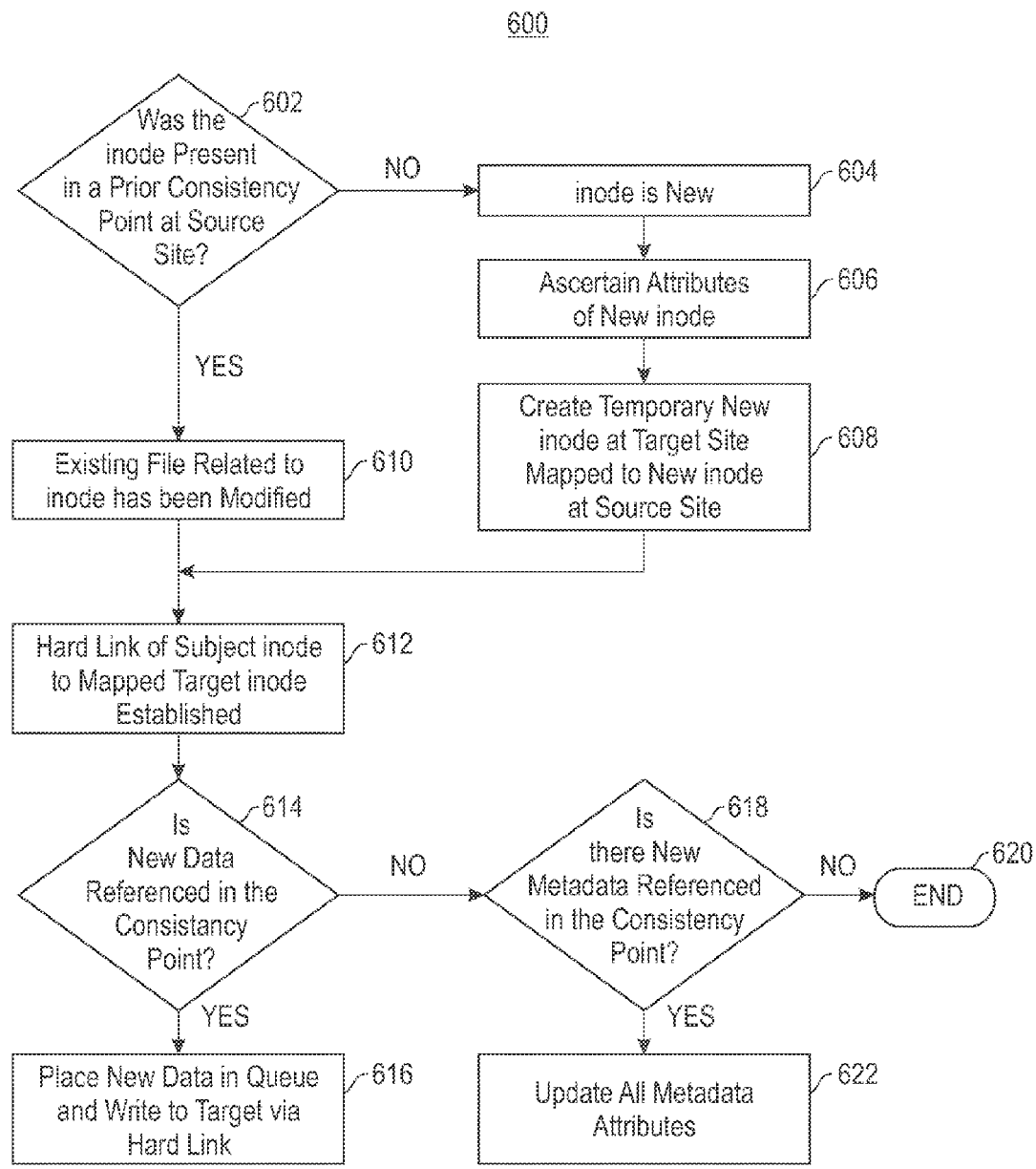
FIG. 6 depicts a flow chart illustrating a process for detection of failure of communication between the source and target sites, and the first aspect of management of a recovery to bring the target site up to date with the data and metadata in the source site.

FIG. 6 is a flow chart (600) illustrating a process for detection of a failure of communication between the source and target site, and the first aspect of management of a recovery to bring the target site up to date with the data and metadata in the source site. For each inode referenced in the most recent consistency point at the source site, it is determined if the inode was present in a prior consistency point at the source site (602). A negative response to the determination at step (602) is an indication that the subject inode is a new inode (604). The attributes of the new inode at the source site are ascertained (606), and a temporary new inode is create at the target site and mapped to the referenced new inode at the source site (608). Accordingly, for each new inode referenced in the most recent consistency point at the source node, a new inode is temporarily created at the target site.

Figure 7:
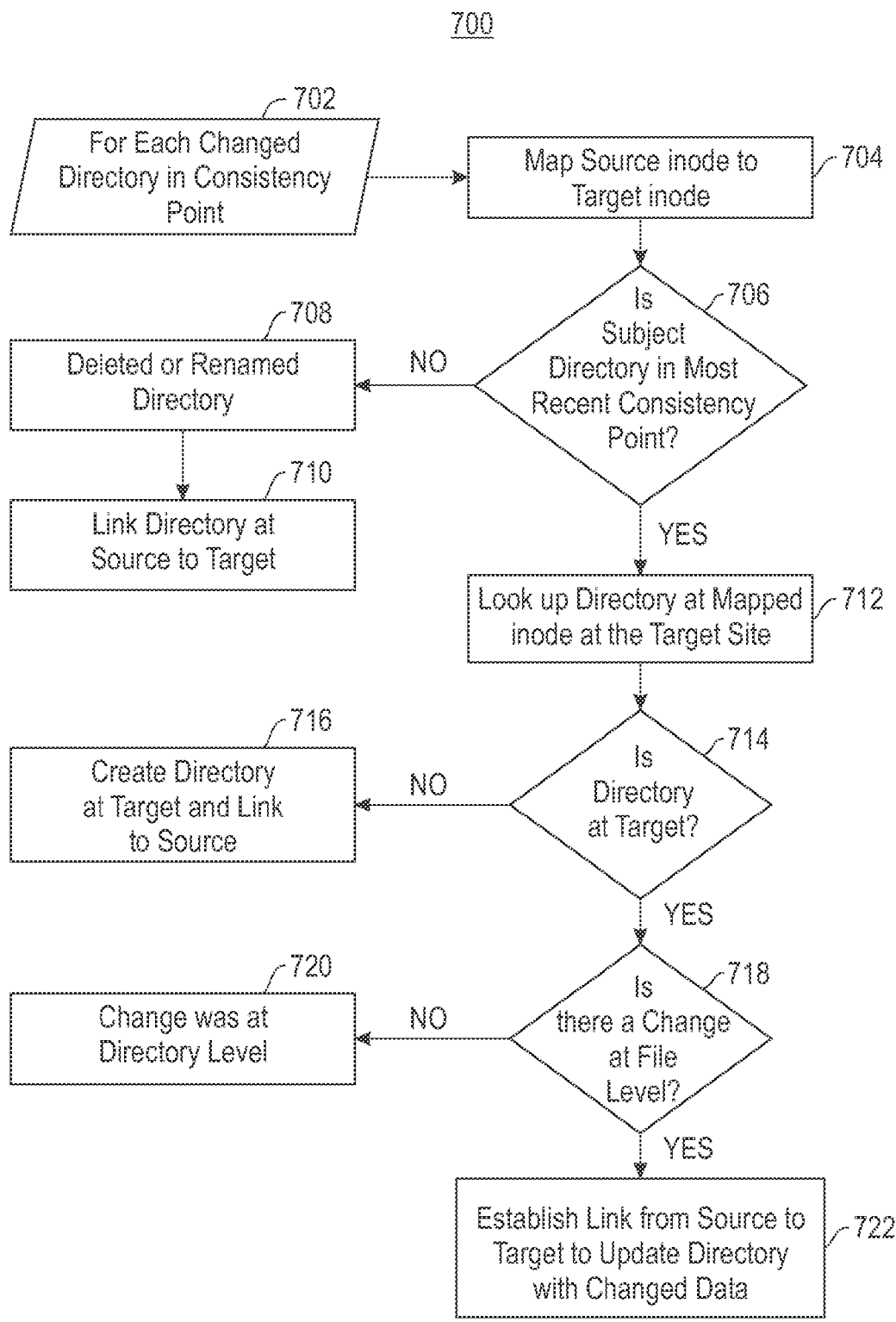
FIG. 7 depicts a flow chart illustrating a process for reconciling directory entries in two consistency points at the source site.

If at step (602), it is determined that the subject inode was present in the prior consistency point, then by reference this inode exists at the target site. The reference to the subject inode indicates that an existing file pertaining to the subject inode has been modified (610). Following either of steps (608) or (610), a hard link of the subject inode to the mapped target inode is established (612). In one embodiment, a hard link is a directory entry that associates a name with an existing file on a filesystem. Once the hard link is established, it is then determined if there is new data referenced in the subject consistency point and associated with the subject inode (614). A positive response to the determination at step (614) is followed by placing new data in the queue at the source site and writing the data to the target inode via the hard link (616). Details of updating the data on the target site are shown in FIG. 7 described below. A negative response to the determination at step (614) is followed by determining if there is new metadata referenced in the subject consistency point and associated with the subject inode (618). If the response to the determination at step (618) is negative, the reconciliation process of the metadata concludes (620). Conversely, a positive response to the determination at step (618) is followed by updating all of the metadata attributes from the consistency point in the source site to the target site (622). Accordingly, metadata consistency is maintained and reconciled between the source and target sites following a communication failure.

As referenced in FIG. 6, the differences between two consistency points at the source site may be present with respect to the data. FIG. 7 is a flow chart (700) illustrating a process for reconciling directory entries in two consistency points at the source site. For each identified changed directory (702), the source inode is mapped to the target inode (704). It is then determined if the subject directory is in the most recent consistency point (706). A negative response to the determination at step (706) is an indication that the subject directory has been either removed or renamed (708). A link for the subject directory is established from the source site to the target site (710). Accordingly, for each directory identified in the consistency point comparison to have been removed or renamed, a link is establish between the two site for communication of the changes from the source site to the target site.

However, a positive response to the determination at step (706) is an indication that the directory has already been established at the target site. As such, a positive response to the determination at step (706) is followed by looking up the subject directory at the mapped inode at the target site (712). It is then determined if the subject directory is present in the mapped inode (714). If the directory is not present, the directory is created at the target site and linked to the subject directory at the source site (716). However, if the directory is present, it is then determined if there is a change at the file level noted in the consistency point comparison at the source site (718). A negative response to the determination at step (716) is an indication that the change was at the directory level (720). Conversely, a positive response to the determination at step (718) shows that the change is at the data level and a link from the source to the target is established to update the appropriate target inode and directory with the changed data (720). Accordingly, data consistency between the source and target sites is maintained at the directory level.

All filesystem operations performed at the source site are replayed in the same order at the target site, thereby guaranteeing write order and read stability. More specifically, identified differences between the source and target site consistency points are applied from the source site as a filesystem operation.

Figure 8:
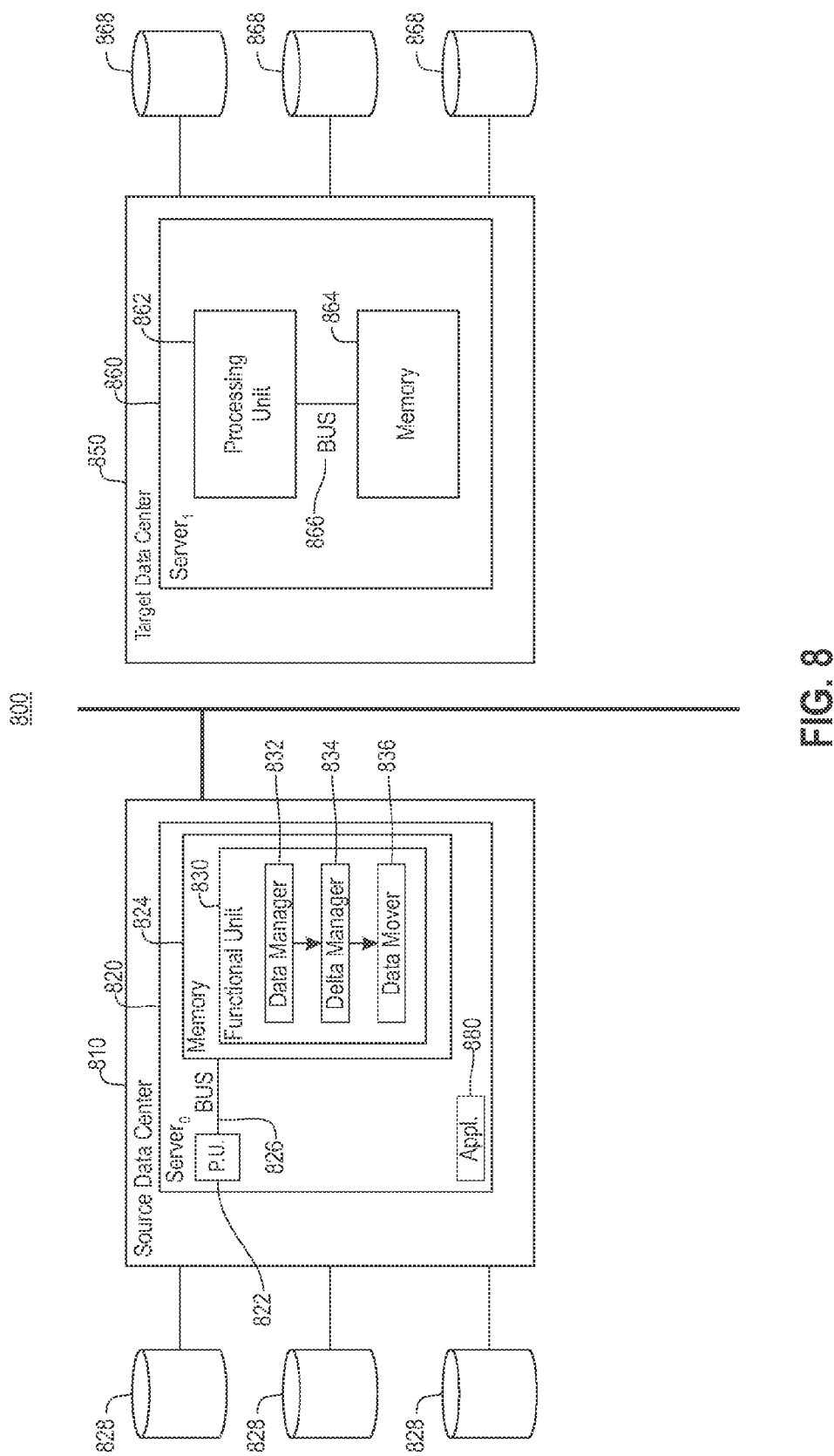
FIG. 8 depicts a block diagram illustrating tools embedded in a computer system to support the synchronization of data.

As demonstrated in the flow charts of FIGS. 4-7, a method is employed to support synchronization of data from a source site to a target site. More specifically, sequential consistency points are created, differences between the consistency points are identified, and the differences are replayed from the source site to a target site as a filesystem operation. In one embodiment, tools to support the synchronization, including creation of the consistency points, ascertaining differences between sequential consistency points, and converting the ascertained differences into filesystem operations for communication to the target site are all local to the source site. FIG. 8 is a block diagram (800) illustrating tools embedded in a computer system to support the synchronization of data as described above. More specifically, a shared pool of configurable computer resources is shown with a first data center (810) and a second data center (850). For purposes of description, the first data center (810) is referred to as a source site and the second data center (850) is referred to as a target site. Although only two data centers are shown in the example herein, the invention should not be limited to this quantity of data centers in the computer system. Accordingly, two or more data centers may be employed to support data synchronization.

Each of the data centers in the system is provided with at least one server in communication with data storage. More specifically, the first data center (810) is provided with a server (820) having a processing unit (822), in communication with memory (824) across a bus (826), and in communication with first local storage (828), and the second data center (850) is provided with a server (860) having a processing unit (862), in communication with memory (864) across a bus (866), and in communication with third local storage (868).

In the example shown herein, an application (880) processes read and write operations local to the first data center (810). Read operations are supported with data in the first local storage (828). Similarly, data from write operations are written to the first local storage (828). Several tools are provided to support synchronization of write data from the first data center (810) to the second data center (850). More specifically, a functional unit (830) is provided local to the first data center (810) in the shared pool and in communication with memory (824) of the server (820). The functional unit (830) manages the tools that support the data synchronization. The tools include, but are not limited to a data manager (832), a delta manager (834), and a data mover (836). The data manager (832) functions to process data at the source site (810) through the use of consistency points. More specifically, the data manager (832) creates consistency points of the filesystem, i.e. source filesystem, local to the source site (810) on a periodic basis.

Each of the created consistency points represents filesystem data and metadata at a point-in-time and function to establish a recovery point in the event of a failure. At a minimum, the data manager (832) creates a first consistency point at a first point-in-time and a second consistency point at a second point-in-time. In one embodiment, after the second consistency point is generated and replicated to the target site (850) the first consistency point may be deleted from the source site (810). Accordingly, the data manager (832) functions to capture at least two images of the source filesystem at different points in time.

As there are at least two consistency points of the source filesystem, the consistency points need to be communicated to the second data center (850) in the event of a communication failure between the first and second data center (810) and (850). To mitigate bandwidth utilization, the communication may be limited to the differences between the two consistency points. The delta manager (834) is provided in communication with the data manager (832), with the functionality of the delta manager (834) to support identification and management of such differences. More specifically, the delta manager (834) compares the first consistency point with the second consistency point and identifies any differences between the first and second consistency points. Accordingly, the delta manager (834) functions to identify differences at both the metadata and data level between two consistency points.

Finally, a data mover (836) is provided in communication with the delta manager (834) to manage application of the differences between the two consistency points as identified by the delta manager (834). More specifically, the data mover (836) generates an output file containing the identified differences, places the identified differences in a queue, and replays the output file as a filesystem operation. In one embodiment, the filesystem operation is replayed from the source site (810) to the target site (850) with the operation including multiple filesystem operations in a simultaneous manner. The filesystem operation employed by the data mover (836) replays only those changes that are reflected in the exact deltas as created by the delta manager (834). In one embodiment, the data mover (836) allows two or more file updates to be coalesced and transient metadata operations, e.g. temporary files, to be ignored. Because the data mover (836) replaces filesystem operations to communicate filesystem changes, the source site (810) and the target site (850) are not limited to homogeneous filesystems. In one embodiment, the source site (810) and the target site (850) may be heterogeneous filesystems. Accordingly, the data mover (836) is responsible for communicating the identified filesystem changes from the source site (810) to a target site (850) in the form of a filesystem operation.

As shown herein, filesystem changes are identified and synchronized from a source site (810) in a shared pool of resources to a target site (850). More specifically, the synchronization is supported by the data manager (832), delta manager (834), and data mover (836). In one embodiment, the synchronization of data from the source site (810) takes place in response to a fault in communication from the source site (810) to ensure that a consistent version of data at the target site (850) is maintained and progressing. Accordingly, consistency of data is maintained at two locations in the cloud to ensure that a replica of data from the source site is available at a secondary location.

As shown, the tools (832)-(836) are provided in the shared pool of configurable computer resources i.e. cloud, local to the source site (810). In one embodiment, the target site does not require any additional tools for computer program code to support the synchronization functionality. As identified above, the data manager, delta manager, and data mover, (832), (834), and (836) respectively, are shown residing in memory (824) of the server (820) local to the source data center (810). Although in one embodiment, the data manager, delta manager, and data mover (832), (834), and (836) respectively, may reside as hardware tools external to memory (824) of server (820), or they may be implemented as a combination of hardware and software. Similarly, in one embodiment, the managers (832)-(836) may be combined into a single functional item that incorporates the functionality of the separate items. As shown herein, each of the manager(s) are shown local to one data center. However, in one embodiment they may be collectively or individually distributed across the shared pool of configurable computer resources and function as a unit to manage synchronization of consistent data from the source site to the target site. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
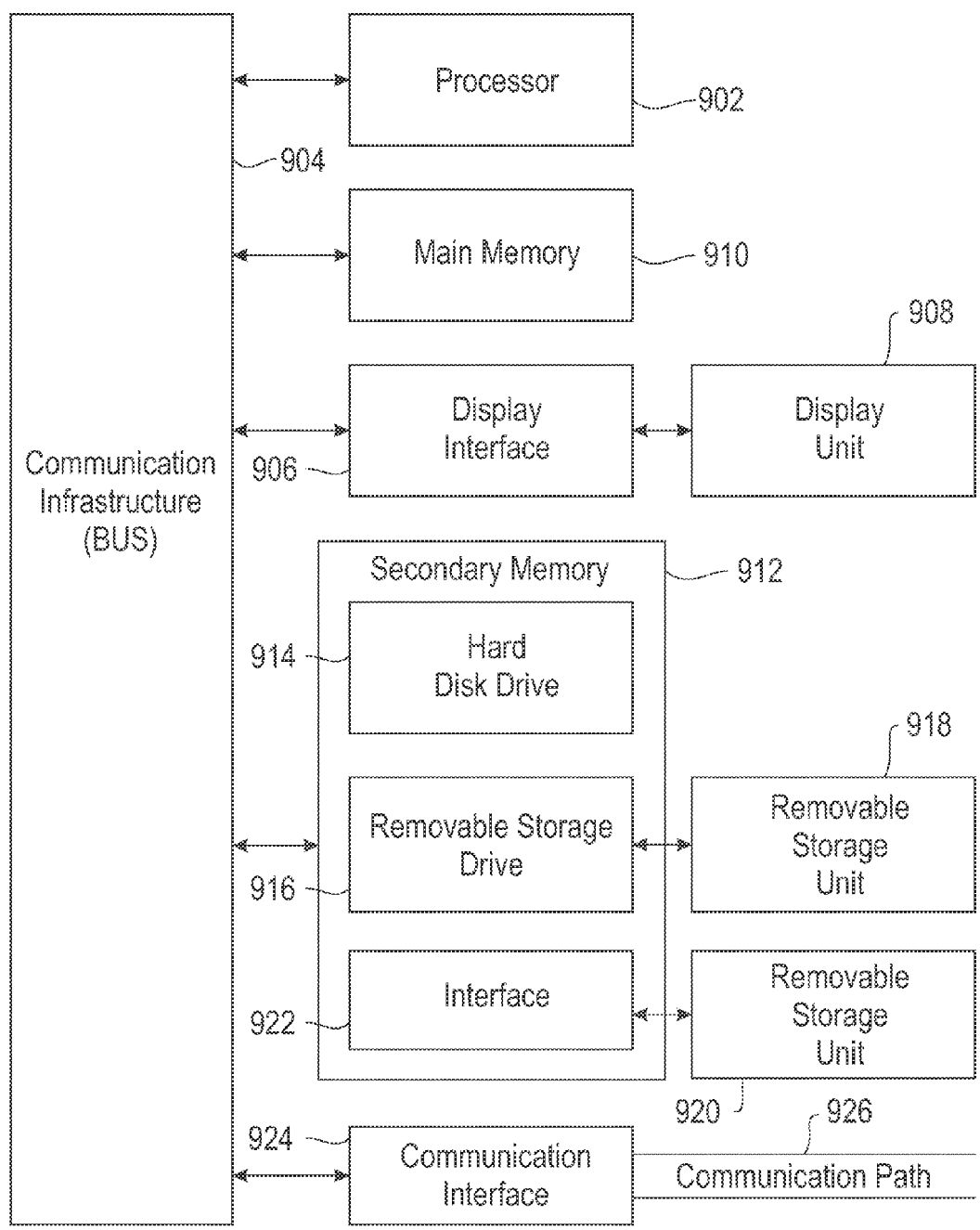
FIG. 9 depicts is a block diagram showing a system for implementing an embodiment of the present invention.

Referring now to FIG. 9 is a block diagram (900) showing a system for implementing an embodiment of the present invention. The computer system includes one or more processors, such as a processor (902). The processor (902) is connected to a communication infrastructure (904) (e.g., a communications bus, cross-over bar, or network). The computer system can include a display interface (906) that forwards graphics, text, and other data from the communication infrastructure (904) (or from a frame buffer not shown) for display on a display unit (908). The computer system also includes a main memory (910), preferably random access memory (RAM), and may also include a secondary memory (912). The secondary memory (912) may include, for example, a hard disk drive (914) and/or a removable storage drive (916), representing, for example, a floppy disk drive, a magnetic tape drive, or an optical disk drive. The removable storage drive (916) reads from and/or writes to a removable storage unit (918) in a manner well known to those having ordinary skill in the art. Removable storage unit (918) represents, for example, a floppy disk, a compact disc, a magnetic tape, or an optical disk, etc., which is read by and written to by removable storage drive (916). As will be appreciated, the removable storage unit (918) includes a computer readable medium having stored therein computer software and/or data.

In alternative embodiments, the secondary memory (912) may include other similar means for allowing computer programs or other instructions to be loaded into the computer system. Such means may include, for example, a removable storage unit (920) and an interface (922). Examples of such means may include a program package and package interface (such as that found in video game devices), a removable memory chip (such as an EPROM, or PROM) and associated socket, and other removable storage units (920) and interfaces (922) which allow software and data to be transferred from the removable storage unit (920) to the computer system.

The computer system may also include a communications interface (924). Communications interface (924) allows software and data to be transferred between the computer system and external devices. Examples of communications interface (924) may include a modem, a network interface (such as an Ethernet card), a communications port, or a PCMCIA slot and card, etc. Software and data transferred via communications interface (924) are in the form of signals which may be, for example, electronic, electromagnetic, optical, or other signals capable of being received by communications interface (924). These signals are provided to communications interface (924) via a communications path (i.e., channel) (926). This communications path (926) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (910) and secondary memory (912), removable storage drive (916), and a hard disk installed in hard disk drive (914).

Computer programs (also called computer control logic) are stored in main memory (910) and/or secondary memory (912). Computer programs may also be received via a communication interface (924). Such computer programs, when run, enable the computer system to perform the features of the present invention as discussed herein. In particular, the computer programs, when run, enable the processor (902) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to application processing and disaster recovery, including, but not limited to, supporting separation of the location of the data from the application location and selection of an appropriate recovery site.

Alternative Embodiment

It will be appreciated that, although specific embodiments of the invention have been described herein for purposes of illustration, various modifications may be made without departing from the spirit and scope of the invention. In particular, the system can be configured to support planned and unplanned synchronization of data and metadata operating at the first data center. Accordingly, the scope of protection of this invention is limited only by the following claims and their equivalents.

We claim:

1. A method comprising:
periodically creating a consistency point in a source filesystem, each consistency point representing filesystem data and metadata at a point-in-time to establish a recovery point, the periodic creation of the consistency point including creating a first consistency point at a first point-in-time and a second consistency point at a second point-in-time, wherein the first consistency point and the second consistency point are any two consistency points;
comparing the first consistency point with the second consistency point, including identifying a difference between the first and second consistency points, wherein the comparison detects presence of a new inode and a changed directory at the filesystem;
responsive to the detection of the new inode, creating a temporary new target inode at a target file system;
mapping at least one target inode, including the temporary inode, to one or more corresponding source inodes;
responsive to the detection of the changed directory, identifying a file level change, wherein a changed file is associated with an established directory at the target filesystem;
establishing a link from the source filesystem to the target filesystem; and
applying the identified difference between the first and second consistency points, including applying the identified difference using the temporary new inode, including replaying the identified difference as one or more filesystem operations, wherein the difference is differential, and including updating the established directory with data associated with the changed file.

2. The method of claim 1, wherein the step of applying the identified difference employs a mapping of one of the source filesystem inodes to a target filesystem inode.

3. The method of claim 1, wherein the step of applying the identified difference includes identifying filesystem operations on filesystem objects using file names.

4. The method of claim 1, wherein the step of applying the identified difference between the first and second consistency points includes producing an exact delta of any metadata change and any data change, and replaying only those changes reflected in the exact delta.

5. The method of claim 1, further comprising generating an output file for the identified difference and replaying the output file as a series of filesystem operations where some of the operations may be replayed concurrently to a target site.

6. The method of claim 1, further comprising replaying the output file after communication failure between the source filesystem and the target filesystem.

7. The method of claim 1, wherein the source and target filesystems are heterogeneous filesystems.

8. The method of claim 1, further comprising reverting changes at the target filesystem by moving to an older consistency point.

9. The method of claim 1, wherein the first and second consistency points are not limited to successive consistency points.

10. A method comprising:
creating a first consistency point in a source filesystem at a first point-in-time and creating a second consistency point in the source filesystem at a second point-in-time, the first consistency point representing filesystem data and metadata at a first point-in-time to establish a first recovery point and the second consistency point representing filesystem data and metadata at a second point-in-time to establish a second consistency point, wherein the first consistency point and the second consistency point are any two consistency points;
following a communication failure associated with the source filesystem, comparing the first consistency point with the second consistency point, including identifying a change between the first and second consistency points, wherein the comparison detects presence of a new inode and a changed directory at the filesystem;
responsive to the detection of the new inode, creating a temporary new target inode at a target filesystem;
mapping at least one target inode, including the temporary inode, to one or more corresponding source inodes;
responsive to the detection of the changed directory, identifying a file level change, wherein a changed file is associated with an established directory at the target filesystem;
establishing a link from the source filesystem to the target filesystem; and
applying the identified change between the first and second consistency points, including applying the identified difference using the temporary new inode, including replaying the identified change as a filesystem operation, wherein the change is differential, and including updating the established directory with data associated with the changed file.

11. The method of claim 10, further comprising creating a third consistency point in the source filesystem at a point-in-time, the third consistency point being sequential with the first and second consistency point, and removing the first consistency point.

12. A computer program product comprising a non-transitory computer readable storage medium having computer readable program code embodied therewith, the computer readable program code comprising:
computer readable program code configured to process data at a source site in a shared pool of configurable resources, including periodic creation of a consistency point in a source filesystem of the source site, each consistency point to capture actual source filesystem data and metadata at a point-in-time to establish a recovery point, wherein a first consistency point and a second consistency point are any two consistency points;

computer readable program code configured to compare the first consistency point with the second consistency point, including identification of any differences between the first and second consistency points, wherein the comparison detects presence of a new inode and a changed directory at the filesystem;

computer readable program code configured to create a temporary new target inode in response to detection of the new inode;

computer readable program code configured to map at least one target inode, including the temporary inode, to one or more corresponding source inodes;

computer readable program code configured to identify a file level change in response to detection of the changed directory, wherein a changed file is associated with an established directory at the target filesystem;

computer readable program code configured to establish a link from the source filesystem to the target filesystem; and computer readable program code configured to apply the identified differences between the first and second consistency points, including the code to apply the identified difference using the temporary new inode, including the code to replay the identified difference as one or more filesystem operations, wherein the difference is differential, and including updating the established directory with data associated with the changed file.

13. The computer program product of claim 12, wherein the program code to replay the identified differences includes program code to identify filesystem operations on filesystem objects using file names.

14. The computer program product of claim 12, wherein the code configured to replay the identified differences between the first and second consistency points produces an exact delta of any metadata change and any data change, and replays only those changes reflected in the exact delta.

15. The computer program product of claim 12, further comprising computer program code configured to generate an output file for the identified differences and to concurrently replay the identified differences between the first and second consistency points to support multiple concurrent filesystem operations.

16. The computer program product of claim 12, further comprising computer program code configured to replay the output file after communication failure between the source site and a target site.

17. The computer program product of claim 12, wherein the first and second consistency points are not limited to successive consistency points.

18. The computer program product of claim 12, further comprising computer program code configured to revert changes at the target filesystem by moving to an older consistency point.

19. The method of claim 1, further comprising, using the first and second consistency points, ascertaining a level of change, including identifying any changes at a directory level, and creating a new directory at a target site responsive to a detected absence of a directory, and establishing a link from the new directory to a corresponding source site directory.

20. The method of claim 19, further comprising identifying any changes at a file level in response to a detected presence of the directory at the directory level, including updating at least one of the directories with the identified file level changes.

* * * * *